United States Patent [19]

Oehlke

[11] 4,200,027
[45] Apr. 29, 1980

[54] FASTENING DEVICE
[75] Inventor: Donald N. Oehlke, Troy, Mich.
[73] Assignee: Eaton Corporation, Cleveland, Ohio
[21] Appl. No.: 826,296
[22] Filed: Aug. 22, 1977
[51] Int. Cl.² .................... F16B 37/00; F16B 39/00
[52] U.S. Cl. .................................... 85/36; 151/41.75
[58] Field of Search ............. 85/32 V, 36; 151/41.74, 151/41.75

[56] References Cited

U.S. PATENT DOCUMENTS

| | | | |
|---|---|---|---|
| 2,062,685 | 12/1936 | Tinnerman | 85/36 |
| 2,101,287 | 12/1937 | Tinnerman | 151/41.75 X |
| 2,236,929 | 4/1941 | Tinnerman | 85/36 |
| 2,239,797 | 4/1941 | Tinnerman | 85/36 |
| 2,291,290 | 7/1942 | Tinnerman | 151/41.75 |
| 2,310,756 | 2/1943 | Tinnerman | 85/36 |

Primary Examiner—James C. Mitchell
Attorney, Agent, or Firm—R. J. McCloskey; H. D. Gordon

[57] ABSTRACT

An improved, one-piece, sheet metal fastener for threadably receiving and lockingly engaging an externally threaded fastener at relatively low clamping forces is provided. The improved fastener comprises a generally arcuate leg having members for engaging external threads formed therein. The arcuate leg, in the non-deformed position thereof, defines an arc section having a radius and a chord, the ratio of said radius to said chord being in the range of 1:1.4 to 1:1.8 and preferably in the range of 1:1.5 to 1:1.7.

2 Claims, 4 Drawing Figures

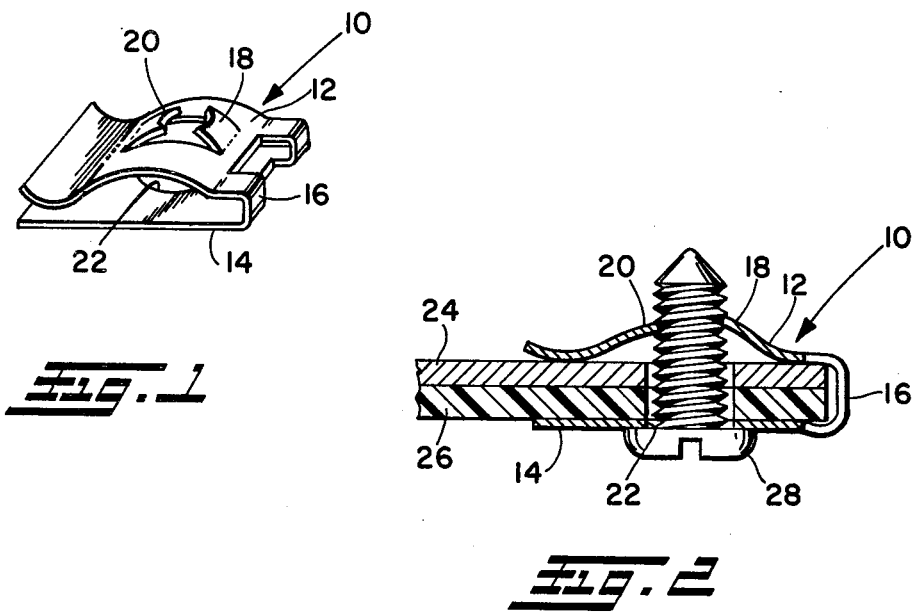
Fig. 1
Fig. 2
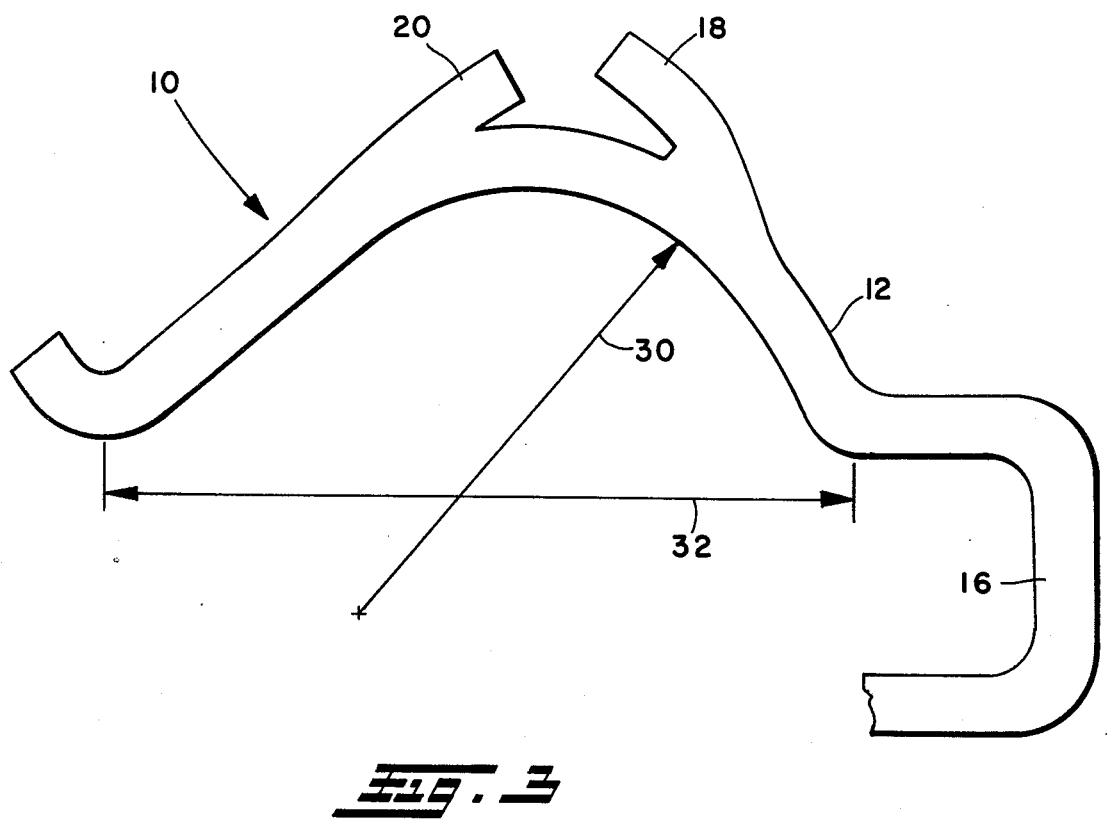
Fig. 3

FASTENING DEVICE

BACKGROUND OF THE INVENTION

1. Field of the Invention

This invention relates to one-piece, stamped, sheet metal fasteners for receiving and engaging externally threaded fasteners of the type having external thread engaging members formed therein and in particular to one-piece, stamped, sheet metal fasteners having an arcuate leg in which the external thread engaging members are formed for threadably retaining and lockingly engaging an externally threaded fastener, the arcuate leg defining an arc having a radius and a chord, the ratio of said radius to said chord, in the non-deformed position of said arcuate leg, being in the range of 1:1.4 to 1:1.8 and preferably in the range of 1:1.5 to 1:1.7.

2. Description of Prior Art

Stamped, one-piece, sheet metal fasteners of the type having external thread engaging members formed therein are well known in the prior art. Examples of such stamped, sheet metal fasteners of the "U" type may be seen by reference to U.S. Pat. Nos. 2,062,685 and 2,101,287. Stamped, sheet metal fasteners of the type having an arcuate leg in which the external thread engaging members are formed may be seen by reference to U.S. Pat. No. 2,236,929. Stamped, sheet metal fasteners of the type seen in the above mentioned patents, and modifications thereof, have been highly successful and continue to enjoy wide usage today. However, such stamped sheet metal fasteners require a relatively large clamping load to achieve a locking engagement with the received externally threaded fastener sufficient to provide a vibration resistant joint for connection such as is required for automotive use and the like. Such a relatively large clamping load, or tensile force in the externally threaded fastener, is not desirable if the fastener is utilized in connection with relatively crushable and/or deformable panels, such as plastic panels, or the like. Such highly tensed externally threaded fasteners, when utilized with relatively brittle plastics such as lucite, tended to crack the brittle plastic, and when utilized with relatively soft plastics tended to cause migration of the soft plastic. In view of this drawback, stamped, sheet metal fasteners of the "U" type have not enjoyed wide acceptance in applications wherein a relatively large clamping force would be applied to a plastic panel, such as a plastic spacer plate, to achieve a vibration resistant connection.

SUMMARY OF THE INVENTION

In accordance with the present invention, the drawbacks of the prior art have been overcome to the extent that a one piece, stamped sheet metal fastener of the type having an arcuate leg in which external thread engaging members are formed has been provided which will lockingly engage a received externally threaded fastener upon the application of a relatively low clamping load, such relatively low clamping load being less than that load tending to crush relatively brittle plastics and/or tending to cause migration of relatively soft plastics. The above is accomplished by utilizing a generally "U" shaped fastener having an arcuate leg in which the external thread engaging members are formed. The generally arcuate leg is of an improved, high arc shape wherein the arcuate leg defines, in the non-deformed position thereof, an arc having a radius and a chord, the ratio of said radius to said chord being in the range of 1:1.5 to 1:1.7. It has been found that the use of a leg having an arcuate shape of the type defined, provides a fastener which will lockingly engage a received externally threaded member upon the application of clamping forces within the range which will not damage most plastic sheets and the like while providing an acceptable vibration resistant connection or joint.

Accordingly, it is an object of the present invention to provide a new and improved one-piece, stamped, sheet-metal fastener.

Another object of the present invention is to provide a one-piece, stamped, sheet metal fastener which will lockingly engage a received externally threaded fastener upon the application of relatively low clamping forces.

A further object of the present invention is to provide a one-piece, stamped, sheet metal fastener of the type having a generally arcuate leg in which external thread engaging members are formed, said arcuate leg defining an arc having a radius and a chord, the ratio of said radius to said chord, in the non-deformed position of said leg, being in the range of 1:1.4 to 1:1.8 and preferably in the range of 1:1.5 to 1:1.7.

These and other objects and advantages of the present invention will become apparent from a reading of the detailed description of the preferred embodiment taken in view of the accompanying drawings.

BRIEF DESCRIPTION OF THE DRAWINGS

FIG. 1 is a front elevational view of the improved fastener of the present invention.

FIG. 2 is a front sectional view taken through the improved fastener of the present invention when applied to the parts to be joined to form a vibration resistant connection therebetween.

FIG. 3 is an enlarged, fragmentary front view of a shadowgraph representation of the improved fastener of the present invention.

DESCRIPTION OF THE PREFERRED EMBODIMENT

Figure 4:
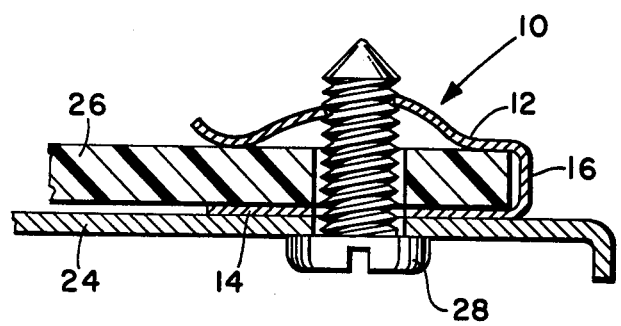
FIG. 4 is a front sectional view taken through the improved fastener of the present invention showing an alternate utilization of the improved fastener to join two parts.

The improved, one-piece, sheet metal fastener 10 of the present invention may be seen by reference to the drawings. The improved fastener 10 comprises a strip of sheet metal, preferably spring steel, which is bent backwardly upon itself to define a generally "U" shape in crosssection comprising two legs, 12 and 14, joined by a bight portion, 16. Leg 12 is of a generally arcuate crosssection and has a pair of tongues, 18 and 20, formed therein for receiving and lockingly engaging an externally threaded fastener as is well known in the art. Tongues 18 and 20 may be replaced by an internal thread impression or the like, as is also well known in the art. Fasteners of the general type described above and illustrated in FIG. 1 are well known in the prior art and have enjoyed great commercial success. Leg 14 has an opening 22 formed therein which is larger in diameter than the outside diameter of the externally threaded fastener to be received and is generally aligned with tongues 18 and 20. The free ends of tongues 18 and 20 are preferably inclined to conform to the pitch of the thread of the externally threaded fastener intended for receipt therein.

Reference to FIG. 2 will illustrate a vibration resistant joint comprising panels 24 and 26 which are coupled by means of the improved fastener 10 of the present invention and an externally threaded fastener 28 which is received and lockingly retained in the improved fastener 10. At least one of the panels, panel 26, is of a plastic material and thus to prevent undesirable squeezing of the plastic panel, the clamping force, i.e., the tensile force in fastener 28, must be of a relatively low value.

An enlarged shadowgraph representation of generally arcuate leg 12 may be seen by reference to FIG. 3. It may be seen that in the non-deformed position of leg 12, the generally arcuate crosssection defines an arc having a radius 30 and a chord 32. In a typical fastener 10, the non-deformed arcuate leg 12 defined an arc with a radius 30 measuring 0.497 inches and a chord 32 measuring 0.825 inches. Said fastener was found to exhibit sufficient locking engagement with a received screw to provide a satisfactory vibration resistant joint between a plastic panel and a sheet metal panel without providing an undesirably high clamping load which would tend to squeeze out the plastic panel. Applicant has discovered that a ratio between the radius 30 and chord 32 in the range of 1:1.4 to 1:1.8 provides satisfactory results with a preferred ratio in the range of 1:1.5 to 1:1.7.

Although the present invention has been described in its preferred form with a certain degree of particularity, it is understood that the present disclosure of the preferred form has been made only by the way of example and that numerous changes in the details of construction and combination and arrangement of the parts may be resorted to without departing from the spirit and the scope of the invention as hereinafter claimed.

I claim:

1. An improved one-piece self-retaining sheet metal fastener for substantially fixed mounting to a panel having an aperture therethrough and for receiving and retaining a rotationally tightened externally threaded fastener, said sheet metal fastener of a generally cross sectionally "U" shape comprising a first leg and a second leg joined by a bight portion, one of said legs comprising an arcuate leg having a plurality of tongues formed therefrom, said tongues inclined at an angle generally equal to the pitch of said externally threaded fastener to be received, said tongues adapted to lockingly engage said externally threaded fastener and to resist rotation clockwise and counterclockwise thereof when said arcuate leg is resiliently deformed by tightening of the externally threaded fastener, the improvement comprising:

said arcuate leg defining an arc in the non-deformed position thereof, the ratio of the radius of the arc to the chord of the arc being in the range of 1:1.4 to 1:1.8.

2. The improved fastener of claim 1 wherein said ratio is in the range of 1:1.5 to 1:1.7.

* * * * *